INVENTOR.
HANS RAINER FERNBACH
BY
Hammond + Littell
ATTORNEYS

Patented Apr. 10, 1951

2,548,427

UNITED STATES PATENT OFFICE 2,548,427

CONTROL APPARATUS FOR PERIODICALLY OPERATING MACHINES

Hans Rainer Fernbach, Parkstone, England, assignor to The Loewy Engineering Company Limited, London, England, a corporation of Great Britain Application June 13, 1945, Serial No. 599,211 In Great Britain March 8, 1944

Section 1, Public Law 690, August 8, 1946 Patent expires March 8, 1964

6 Claims. (Cl. 164—68)

This invention relates to the control of processing machinery operating periodically on a piece of continuously moving material.

The invention has been developed in connection with shears for sub-dividing a piece of hot or cold rolled metal of any shape into equal lengths, and it will be later described with reference to such a shear. It is, however, to be understood that the invention is not limited to this particular field. It is equally applicable to any other class of processing machinery working at predetermined intervals on a piece of continuously moving material of any kind.

The invention is designed in the first place to be employed in connection with processing machines which are started and stopped for each operation, without, however, being limited thereto and the invention is also applicable to continuously operating machines having tools or other processing means which are periodically brought into and out of their operative positions. It is a well-know fact that the length of material passed through such a machine between successive operations—which, in the case of shears, is the length cut off—depends for a given feeding speed of the material on the time interval between successive operations of the processing element of the machine, so that this length is varied by varying this interval.

It is an object of the invention to provide improved means for the control of a processing machine operating periodically on a piece of moving material.

It is a further object of the invention to provide control means of the kind referred to in the preceding paragraph, which means are readily adjustable for varying the length of material passed through a processing machine between successive operations.

It is a further object of the invention to provide such control means in which the adjustment of length is independent of the feeding speed of the material.

According to the invention, the control means for a processing machine periodically operating on a piece of continuously moving material comprise an oscillating pilot member driven at a speed having a definite relationship to the feeding speed of the material and adapted, on reaching a predetermined position in its stroke, to cause the processing machine to operate. The interval between successive operations of the processing machine is, therefore, determined by the length of stroke of the oscillating pilot member, or, in other words, the length of material passing through the machine between successive operations corresponds in ratio to the amplitude of the oscillations. This length can therefore be varied by merely varying the amplitude of the oscillating pilot member, which can be achieved by very simple means. Any point along the stroke of the oscillating pilot member may be selected for causing the processing machine to operate, but it is preferable, for reasons to be stated later, to effect operation of the processing machine simultaneously with the reversals of the pilot member.

It will be noted that since the oscillating pilot member is driven at a speed which has a fixed relationship to the feeding speed of the material, and since thus any variation in this speed will result in a corresponding variation in the speed of the pilot member, the interval between successive operations of the processing machine will be shortened when the feeding speed of the material increases, or, conversely, lengthened when the feeding speed decreases, so that the length of material passed through the processing machine between successive operations will remain the same for a given setting of the oscillating pilot member, irrespective of any variations in the feeding speed.

Control of the processing machine is preferably effected by electrical means and the oscillating pilot member is therefore, according to a further feature of the invention, combined with electrical control means responsive to the displacements of the pilot member. The electrical control means may be of the photo-electric type, and in this case the pilot member will have alternately transparent and opaque portions adapted to control the incidence of light on to a photo-electric cell. A very simple arrangement of the apparatus according to the invention is obtained by using one and the same electrical control means for the control of the operation of the processing machine and for the control of the movement of the oscillating pilot member, and it is for this reason that it is preferable to effect operation of the processing machine at the points of reversals of the pilot member.

The oscillating pilot member may be driven directly from a pair of rolls or rollers rotating at the feeding speed of the material, such as feed rollers, and a reversible drive may be arranged between those rolls or rollers and the oscillating pilot member, the drive including electrically controllable elements for effecting the reversal of its direction.

In the following, one embodiment of the invention is described by way of example with reference to the accompanying drawings in which:

Fig. 1a is a detail of Fig. 1 showing the drive for the oscillating pilot member.

Fig. 4 is a diagrammatic illustration of a special type of relay employed in connection with the electric circuits shown in Fig. 3.

Figure 1:
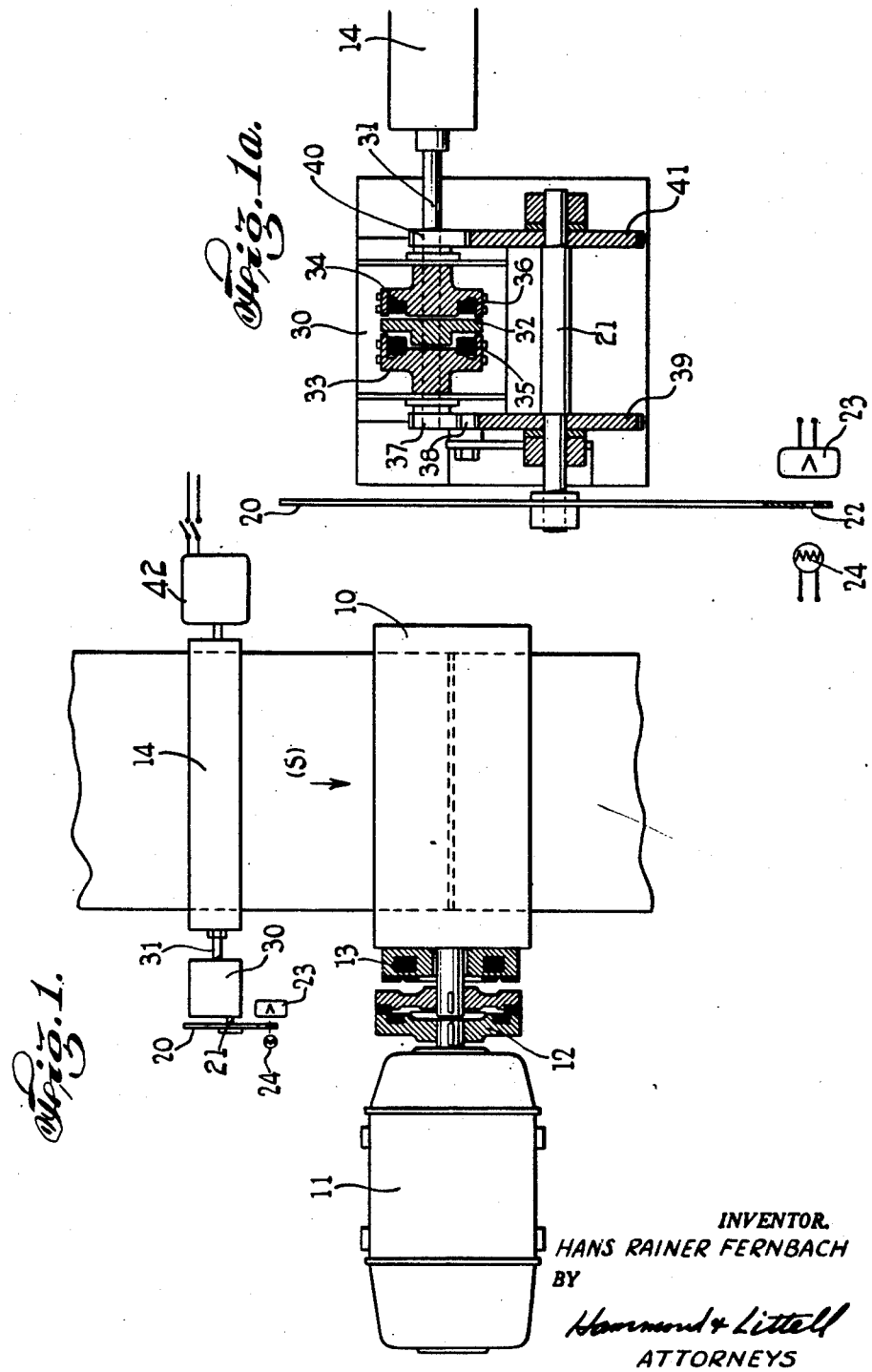
Fig. 1 shows a general arrangement of a control apparatus according to the invention applied to the control of a flying shear for cutting metal in bar, strip or other form.

In the drawings, 10 designates diagrammatically the processing machine whose operation is to be controlled and which, in the embodiment described here, is a flying shear for cutting a strip S of metal.

The shear 10, which is of the type which is started and stopped for every cut, is driven by an electric motor 11 through a magnetic clutch 12 which is engaged before an disengaged after each cut; a magnetic brake 13 is combined with the clutch so as to ensure that the shear 10 is brought rapidly to a standstill after each cut.

The strip S to be cut is fed to the shear by means of a pair of rollers 14, driven by motor 42. In those cases where the strip S is still in the last stand or stands of some other processing machine, such as a rolling mill, whilst being cut by the shear 10, the rollers 14 will be driven in synchronism with this other processing machine by any well-known means not shown here. The means for controlling the operation of the shear 10 so as to cause it to be started at predetermined and regular intervals form the subject of the present invention and will be described now in detail; these means are adjustable so as to allow the length of the cuts made by the shear to be varied over a wide range.

The control means for the shear comprise in the first place an oscillating pilot member in the form of a scanning disc 20 mounted on a shaft 21 and having an arcuate slot 22. A photo-electric cell 23 and a lamp 24 are so arranged relative to the disc that a beam of light falling from this lamp on to the cell 23 can alternately pass freely through the slot 22 and be intercepted by the solid part of the disc on rotation of the latter.

In the embodiment described here, the cell 23 is of the type in which its illumination will cause an electric current to flow through a relay connected in series therewith and in which, conversely, the relay will be de-energised when the beam of light is intercepted and the slot obscured. The energisation and de-energisation of the relay is utilised to control the movement of the disc itself in a manner which will be presently described. The disc 20 is preferably provided with a mask 80 (Figs 2a and 2b) which can be adjustably set so as to obscure a predetermined portion of the slot 22.

Figure 2:
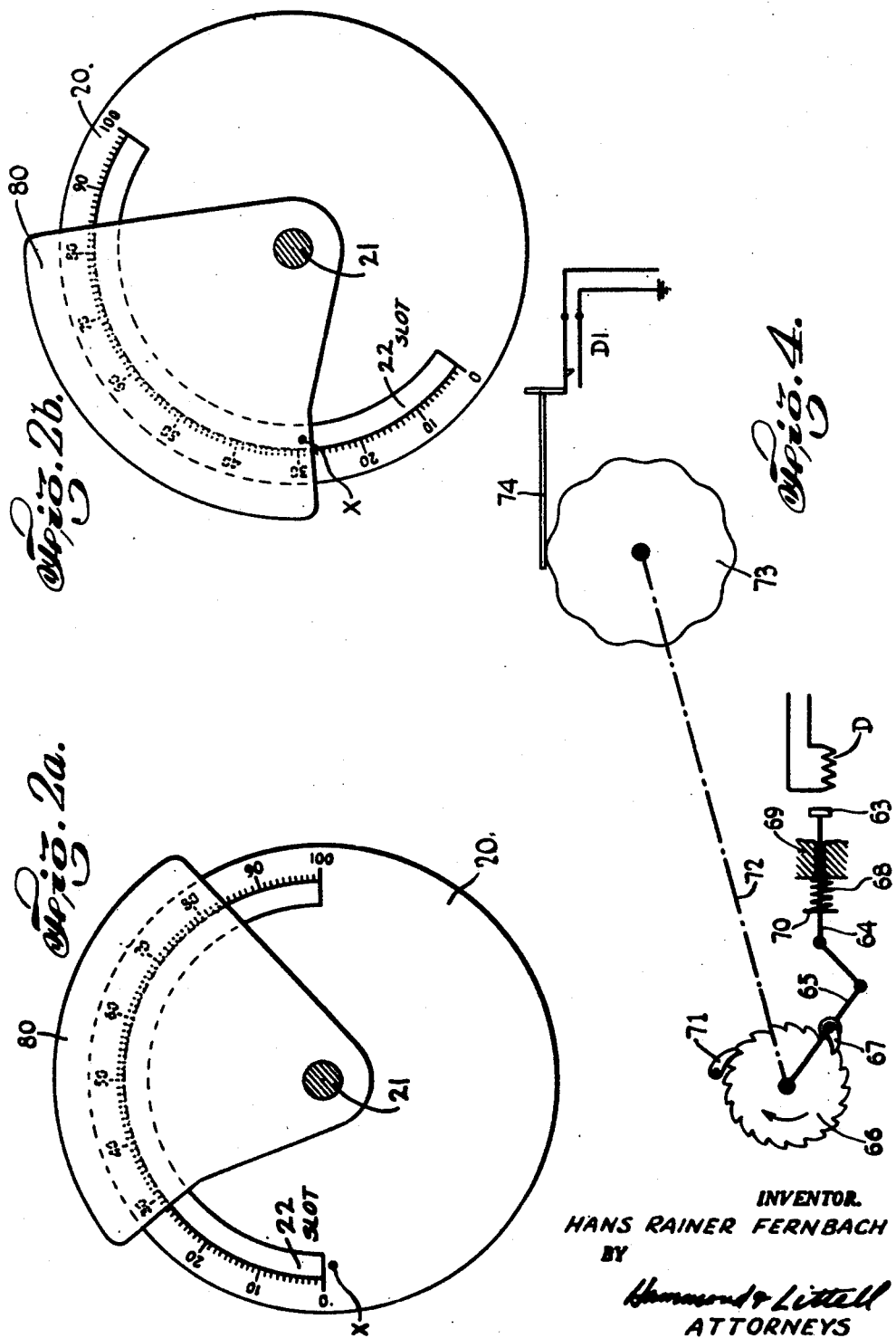
Figs. 2a and 2b are detail views of two different positions of the latter.

According to a feature of the invention, the disc 20 does not make a continuous rotation, but is oscillated about its shaft 21 between the end positions shown in Figs. 2a and 2b, the movement of the disc being derived from the rotation of the feed rollers 14 so that the disc 20 will oscillate at a speed corresponding exactly in ratio to that of the feed rollers and hence of the material to be cut.

A reversible drive for the disc 20 is arranged between the feed rollers 14 and its shaft 21, as diagrammatically indicated at 30 in Fig. 1 and more fully shown in Fig. 1a. This drive comprises a shaft 31 which carries splined thereon, so as to be rotatable therewith, an axially movable armature 32. Loosely mounted on shaft 31, so as to rotate freely thereon, but held against axial movement, are two coupling halves 33 and 34, each having a magnetising coil 35 and 36 respectively energised over slip rings not shown here.

Coupling half 33 carries a pinion 37 which, through the intermediacy of pinion 38, drives gear wheel 39 on disc shaft 21. Coupling half 34 carries a pinion 40 which drives directly a gear wheel 41 on disc shaft 21. Energisation of coil 35 on coupling half 33 will cause armature 32 to be drawn against coupling half 33 and thus to be rotated together with shaft 31, whereby shaft 21 and disc 20 will be rotated in what is assumed here to be a counter-clockwise direction, whilst energisation of coil 36 on coupling half 34 will cause armature 32 to be drawn against coupling half 34 and thus to be rotated with shaft 31, whereby shaft 21 and disc 20 will be rotated in the opposite, i. e., clockwise direction. Any suitable means (not shown) to keep the armature 32 apart from the coupling halves 33 and 34 when their coils 35 and 36 are de-energised, may be provided.

From the foregoing it will be apparent that by alternately energising the two coils 35 and 36, an oscillating movement of shaft 21 and disc 20 is produced. Alternate excitation of the two coils 35 and 36 is effected by electric control means responsive to the intermittent illumination of the photo-cell 23, which in turn is controlled by the displacements of the disc 20 itself, in a manner which will now be described in detail.

Figure 3:
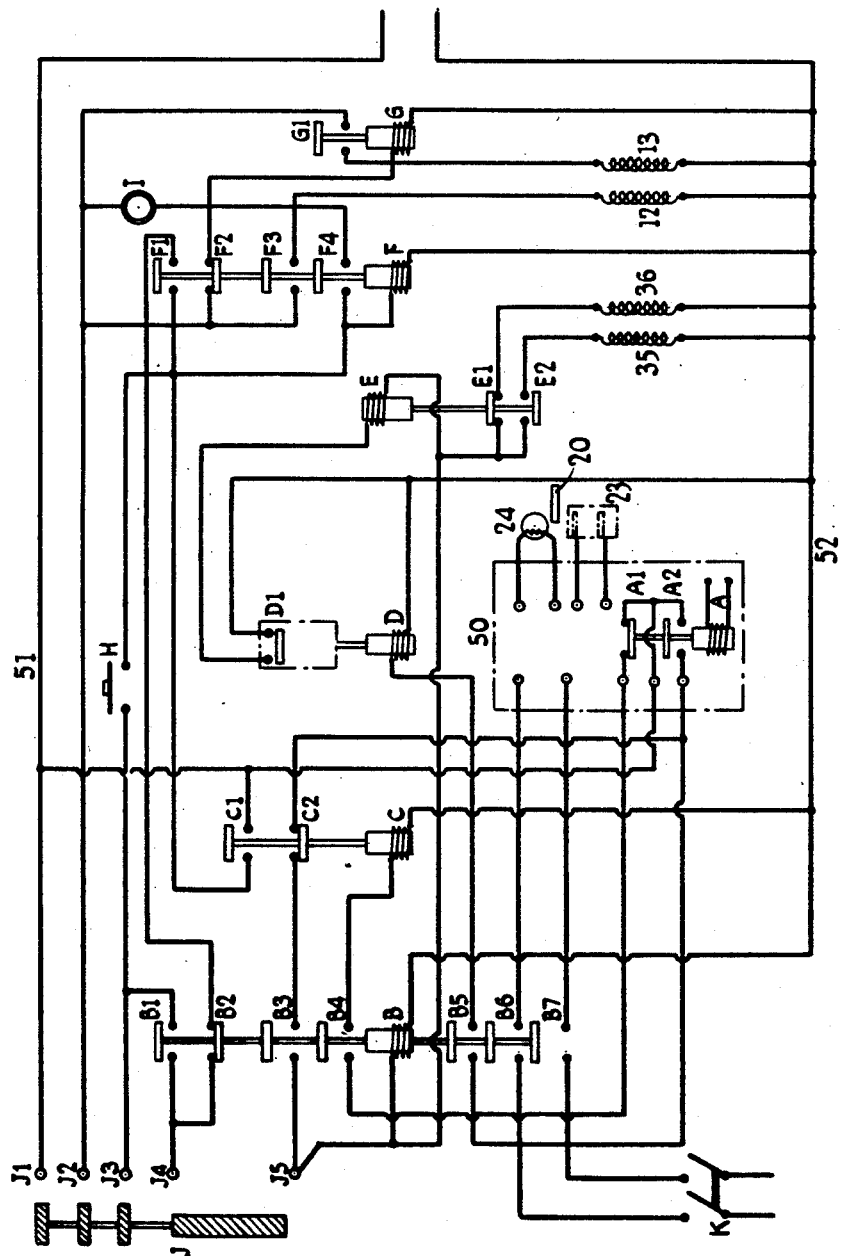
Fig. 3 is an electric circuit diagram

These means are shown diagrammatically in Figs. 3 and 4. They include, besides the photoelectric cell 23 and the lamp 24 already mentioned, an amplifier which may be of any conventional type and which in Fig. 3 is diagrammatically shown at 50. Associated with and combined with the cell and the amplifier is a relay A having contacts at A1 and A2, the relay being energised, as stated before, when the cell 23 is illuminated, and de-energised when the cell is obscured. The electric circuits further include relays B, C, D, E, F and G which are all of the conventional contactor type, excepting the relay D, all relays having a number of contacts arranged in pairs and adapted to be closed by the armatures of the respective relays, which in the following description will be designated by indices attached to the corresponding letter of the relay. A push button H and a limit swich I for the shear 10 are further provided in the electric control system. The magnetising coils 35 and 36 of the reversible drive for the disc 20, and the magnetising coils for the clutch 12 and for the brake 13 of the shear, also form part of the electric system. These coils, as well as the relays A to G, are all fed from a source of supply through mains 51 and 52 over a master switch J. The photo-electric cell 23 and the lamp 24, as well as the amplifier 50, are fed from another source of supply through isolating switch K.

The relay D has the particular feature that its armature changes its position only when the relay is de-energised, so that these contacts are closed every first, third, fifth, etc. time the relay is de-energised. A suitable form of relay incorporating this feature is shown in Fig. 4. The armature 63 of the relay is connected by a rod 64 and a pair of links 65 to the axis of a ratchet wheel 66, a pawl 67 co-operating with that wheel being pivotally mounted on one of those links. A spring 68 is inserted between a fixed stop 69 and a collar 70 on rod 64, the arrangement being such that the spring 68 will urge the pawl 67 against a tooth of the ratchet wheel 66 and rotate the latter one step forward. On energisation of the relay D, the armature 63 will be attracted towards the coil of the relay, thus overcoming the force of the spring 68, and the pawl 67 will be swung aside so as to ride ineffectively over the teeth of the ratchet wheel 66. A detent 71 is further provided for holding the ratchet wheel 66 against backward movement. The ratchet wheel 66 is mounted on a shaft 72 which carries a cam wheel 73; the latter has a number of projections and depressions around its edge, there being half as many projections and depressions as there are teeth on the ratchet wheel 66. A pivoted and contact-carrying leaf spring 74 is arranged so as to bear against the rim of the cam wheel 73. Thus, when the ratchet wheel 66 is moved one step forward by the pawl 67 at the de-energisation of the relay, the spring 74 will alternately drop from a projection into a depression and rise from a depression to a projection, thus causing any contacts carried by the spring 74 to change their position each time. As there are half as many projections and depressions as there are teeth on the ratchet wheel, the position of these contacts will be the same at every second de-energisation of the relay, whilst energisation of the relay has no effect on the position of the contacts. A similar result may be obtained by some other mechanism, or by purely electrical means, such as a combination of suitable relays.

Operation of the control circuits shown in Fig. 3 will now be described in detail.

The shear is set in readiness for operation by closing the master switch J and the isolating switch K. Upon closure of master switch J relay G will be energised through master switch contacts J1 and J2 and normally closed contact F2 of relay F. Energisation of relay G closes its own contact G1, whereby a circuit is established for shear brake coil 13 over master switch contacts J1, J2 and contact G1. The shear brake is now energised and the shear 10 held against rotation.

To ensure correct operation, it is necessary for the disc to occupy one of the positions shown in Figs. 2a and 2b at the beginning of the cycle of operations, and the means for achieving this will be described further below.

In the following it will be assumed that the disc 20 is in the position shown in Fig. 2a, with the beam of light from lamp 24 impinging on the opaque portion of the disc just below the left hand end of the slot 22, as indicated at X. Further, the armature D1 of the two-step relay is set in such a way that it is closed when the disc is in the position of Fig. 2a.

In order to start the shear on a cycle of cutting operations, the push button H is depressed, whereby relay F is energised through master switch contacts J1, J3 and push button H. Energisation of relay F closes its contacts F1, F3 and F4 and opens its contact F2. Opening of contact F2 de-energises relay G which opens contact G1, thus de-energizing shear brake coil 13. Closing of contact F1 established a circuit for relay B through master switch contacts J1, J3, push button H, contact F1, normally closed contact B2 and master switch contacts J4, J5. Closing of contact F3 establishes a circuit for clutch coil 12 through master switch contacts J1, J2 so that the shear begins to rotate, the shear brake being made inoperative at the same time by de-energisation of coil 13. Contact F4 establishes a holding circuit for relay F through master switch contacts J1, J2 and shear limit switch I, so that the relay F remains energised after the push button H has been released.

Energisation of relay B closes contacts B1, B3, B4, B5, B6 and B7 and opens contact B2. Closing of contact B1 establishes a holding circuit for relay B through master switch contacts J1, J3 and master switch contacts J4, J5, so that the relay B will remain energised after the push button H has been released and after the contact B2 has been opened. Closure of contacts B6 and B7 will cause current to be supplied to the amplifier 50, the photo-electric relay A, the photocell 23 and the lamp 24.

In the position shown in Fig. 2a, the cell 23 is obscured by the opaque part of the disc 20, hence the photo-electric relay A is de-energised, its contact A1 being closed and its contact A2 being opened. Closure of contact B1 establishes a circuit for the energisation of relay E through master switch contacts J1, J3, master switch contacts J4, J5 and contact D1 which, as stated before, is assumed to be closed at the beginning of operations. Energisation of relay E opens contact E1 and closes contact E2. Opening of contact E1 de-energises coil 36 of the reversible drive of disc 20 and energises coil 35 of the other clutch of this drive, whereupon the disc 20 begins to rotate in a counter-clockwise direction, thus moving from the position shown in Fig. 2a towards the position shown in Fig. 2b.

Immediately after the disc 20 has begun to move, the slot 22 enters into the path of the beam of light so that photo cell 23 is illuminated and the relay energised causing contact A1 to open and A2 to close. Closing of contact A2 establishes a circuit for the relay D direct from line 51 and across contact B5. As explained before, the mechanism for actuating contact D1 is so organised that energisation of relay D will not result in a change of position of armature D1, which will remain closed. Opening of contact A1 de-energises relay C which was previously supplied with current direct from line 51 across contact B4 and which now opens its contact C1 and closes its contact C2. Opening of contact C1 prepares the way for the action of the shear limit switch I which de-energises relay F when opening, and thus also shear clutch 12, after the shear has carried out a cutting operation, and traversed its path. At the same time, shear brake 13 is energised by the closure of contact F2, whereby relay G is energised. The shear is now brought to a standstill and is ready for the next cut. It is to be noted here that the dimensions of the disc 20, and in particular the length of its slot 22, are so selected that the shear limit switch I becomes effective for stopping the shear whilst the slot 22 is still in the path of the beam of light.

The disc 20 continues its counter-clockwise rotation until it reaches the position of Fig. 2b wherein the light beam, shown at X, is obscured by the mask 80 of the disc. The relay A now closes its contact A1 and opens its contact A2, whereby relay D is de-energised. This causes the armature D1 to change its position, i. e., to open, whereby the relay E is de-energized, closing contact E1 and opening contact E2. Closing of contact E1 energises coil 36 and opening of contact E2 de-energises coil 35, both forming part of the reversible drive of disc 20, whereby the latter is caused to rotate in the opposite, i. e., clockwise, direction. Furthermore, relay C is energised direct from line 51 through contacts A1 and B4, whereby contact C1 is closed and contact C2 opened. Opening of contact C2 is of no consequence at this stage, whilst closing of contact C1 established a circuit for relay F direct from line 51.

Energisation of relay F closes contacts F1, F3 and F4 and opens contact F2 as before, whereby the shear brake coil 13 is de-energised and the shear clutch coil 12 energised, thus starting the shear for another cutting operation. The shear is stopped in the same manner as before by limit switch I which interrupts the holding circuit for relay F previously establishes across contact F4.

Immediately after disc 20 has begun its clockwise rotation, the slot 22 enters the path of the beam of light so that the cell 23 is illuminated and the photo-relay A caused to change position of its armatures A1 and A2, de-energizing thereby relay C in the same manner as before when the disc 20 was rotating in the opposite direction. Relay D will be energised again direct from line 51 through contacts A2 and B5 without, however, causing armature D1 to change its position.

The disc 20 continues to rotate in a clockwise direction until the slot 22 is outside the path of the beam of light, or in other words, until the disc has returned to the starting position shown in Fig. 2a. The beam of light is then obscured and the armatures A1 and A2 change their positions again, opening the contact A2 and thereby de-energising the relay D. This results in a change of position of contact D1 which is closed again, whereby relay E is energised. This causes contact E1 to open and contact E2 to close; hence the magnetising coil 35 is energised and the magnetising coil 36 de-energised causing another reversal in the rotation of disc 20 which will now rotate again in a counter-clockwise direction. A fresh cycle of operations is hereby started.

The cycle of operation is repeated indefinitely until the shear master switch J is opened. Every time the disc 20 makes an oscillation, either in a clockwise or counter-clockwise direction, the shear 10 is started, carries out a cut and is stopped again, so that the shear will operate automatically throughout the whole cycle.

It is evident that the interval between successive cuts depends on the time the disc 20 takes to complete one oscillation, and this again depends for a given speed of the shaft 20 on the length of the slot 22. The interval between successive operations of the shear, and hence the length of the cuts made by the shear, can therefore be varied by altering the length of the slot 22, and it is for this purpose that the mask 80 is provided.

It will be apparent from the above description that for correct operation it is necessary for the disc 20 to be in either of the two positions shown in Figs. 2a or 2b, i. e., with a beam of light impinging on the opaque part of the disc just outside the slot. Means are provided to ensure that disc 20 will always return to one of these two positions after a cycle of operations has been terminated. For this purpose the relay B is maintained energised for a short while after the master switch J has been opened, should the master switch J be opened whilst the disc 20 presents its slot 22 to the beam of light. The circuit for relay B is established direct from line 51 through contact A2 (which is closed, the photo-electric cell 23 being illuminated), further contacts C2 and B3 and the master switch contact J5. Similarly, whichever of the two coils 35 and 36 of the reversible drive for the disc 20 is energised at the time of the opening of the master switch J, will remain so, as both coils are connected to master switch contact J5. The disc 20 continues, therefore, its rotation in the same direction as before the opening of master switch J until the disc arrives at a position in which it obscures the beam of light whereby contact A1 is closed and contact A2 opened. Closure of contact A1 momentarily energises relay C over contact B4, whereby contact C2 is opened; thus relay B is de-energised causing contacts B1, B3, B4, B5, B6 and B7 to open and contact B2 to close. Opening of contacts B6 and B7 cuts off the supply to the amplifier 50 and to the photo-electric equipment. At the same time, the supply to the magnetising coils 35 and 36 and to coil E is interrupted due to the opening of the contacts A2 and B3, so that the disc 20 will be stopped immediately after its opaque part has entered the path of the beam of light.

The opening of contact B5 de-energises relay D causing armature D1 to change its position, whereby a reversal of the drive for disc 20 at the re-starting of the next cycle is prepared. Thus, the disc 20 is prevented from beginning its next cycle in the wrong direction and from presenting its opaque sector to the beam of light during oscillation, which would make it impossible for the control apparatus to function correctly.

What I claim is:

1. A control apparatus for a processing machine periodically operating on continuously moving material, comprising a pilot member having a light transmitting portion of adjustable length, a reversible drive connected with said pilot member and operable to oscillate said pilot member, material movement responsive means connected with said pilot member and adapted to impart an oscillating movement thereto through said reversible drive, said drive including electrically controllable elements effecting the reversals of said drive, and photo-electric control means connected to said processing machine and cooperating with said adjustable light transmitting portion of the pilot member operating the processing machine at each reversal of said pilot member to cause the processing machine to operate at spaced intervals on the material according to the adjusted length of the light transmitting portion of the pilot member.

2. A control apparatus for a processing machine periodically operating on continuously moving material, comprising a pilot member, a reversible drive connected with said pilot member, material movement responsive means connected with said pilot member and adapted to impart an oscillating movement thereto, said drive including a pair of clutch members selectively connecting said movement responsive means with said pilot member, one of said clutches driving the pilot member in one direction and the other of said clutches driving the pilot member in the opposite direction, and control means connected with said reversible drive pilot member operating the processing machine at each reversal of each said pilot member.

3. A control apparatus for a processing machine periodically operating on continuously moving material, comprising a pilot member having a light transmitting portion of adjustable length, material movement responsive means, a reversible drive connected with said pilot member and selectively connecting said material movement responsive means therewith including a pair of clutches, said clutches being connected to said pilot member so that one clutch drives the pilot member in one direction and the other clutch drives the pilot member in the opposite direction so as to impart an oscillating movement thereto, and photo-electric control means connected to said processing machine and cooperating with said adjustable light transmitting portion of the pilot member operating the processing machine at each reversal of said pilot member.

4. A control apparatus for a processing machine periodically operating on continuously moving material, comprising a pilot member having a light transmitting portion of adjustable length, material movement responsive means, a reversible drive connected with said pilot member and selectively connecting said material movement responsive means therewith, and photo-electric control means connected to said processing machine and cooperating with said adjustable light transmitting portion of the pilot member operating the processing machine at each reversal of said pilot member.

5. A control apparatus for a machine periodically operating on continuously moving material, comprising feed rolls for the material, a pilot member, a reversible drive for said pilot member connected to said feed rolls so as to impart an oscillating movement to said pilot member, said drive including electrically controllable elements for effecting the reversals of the drive, electrical control means for said elements comprising a photo-cell and a relay responsive to the displacement of said pilot member, said relay having an armature and contacts opened and closed by a movement of said armature in the same direction, said electrical control means being further adapted to cause the machine to operate at predetermined points of the oscillations of the pilot member.

6. A control apparatus for a processing machine periodically operating on continuously moving material, comprising feed rolls for the material, a pilot member, a reversible drive for said pilot member directly connected to said feed rolls so as to impart an oscillating movement to said pilot member, said drive including electrically controllable elements for effecting the reversals of the drive, electrical control means for said elements comprising a relay responsive to the displacements of said pilot member, said electrical control means also being connected to said processing machine to cause the machine to operate at predetermined points of the oscillations of the pilot member.

HANS RAINER FERNBACH.

REFERENCES CITED

The following references are of record in the file of this patent:

UNITED STATES PATENTS

| Number | Name | Date |
| --- | --- | --- |
| 1,902,604 | Winter | Mar. 21, 1933 |
| 2,070,537 | Matthews | Feb. 9, 1937 |
| 2,093,287 | Milmoe | Sept. 14, 1937 |
| 2,228,896 | Macfarren | Jan. 14, 1941 |
| 2,274,452 | Macfarren | Feb. 24, 1942 |
| 2,379,682 | Colucci | July 3, 1945 |
| 2,394,324 | Miller | Feb. 5, 1946 |
| 2,394,558 | Miller & Johnson | Feb. 12, 1946 |